United States Patent
Eglen

[15] 3,685,607
[45] Aug. 22, 1972

[54] AIR SUPPORT VEHICLE
[72] Inventor: Jan A. Eglen, Terre Haute, Ind.
[73] Assignee: Eglen Hovercraft, Inc.
[22] Filed: March 26, 1970
[21] Appl. No.: 22,848

[52] U.S. Cl..................................180/117, 180/116
[51] Int. Cl. .........................B60v 1/14, B60v 1/18
[58] Field of Search ............180/117, 124, 129; 9/6; 114/77

[56] References Cited
UNITED STATES PATENTS

| | | | |
|---|---|---|---|
| 2,376,753 | 5/1945 | Bowen | 9/6 |
| 2,855,885 | 10/1958 | Thomas | 9/6 X |
| 2,995,104 | 8/1961 | Mills | 9/6 X |
| 3,082,836 | 3/1963 | Billman | 180/124 |
| 3,153,461 | 10/1964 | Bollum, Sr. | 180/117 |
| 3,205,960 | 9/1965 | Sperazz, Sr. | 180/117 |
| 3,232,366 | 2/1966 | Cockerell | 180/124 |
| 3,291,242 | 12/1966 | Tinajero | 180/129 X |
| 3,372,408 | 3/1968 | Luger et al. | 9/6 |
| 3,468,395 | 9/1969 | Winter | 180/117 |
| 3,543,314 | 12/1970 | Tropf et al. | 9/6 |

*Primary Examiner*—A. Harry Levy
*Attorney*—Clarence A. O'Brien and Harvey B. Jacobson

[57] ABSTRACT

A vehicle constructed for operation on the air cushion principle and including an internal tubular frame mounting all of the operational components of the vehicle. The vehicle body is molded into sections separate from the independently constructed frame. The assembled vehicle includes a single power source for the lift and pusher fans or propellers and the skirt is in the nature of an inflated tube.

12 Claims, 7 Drawing Figures

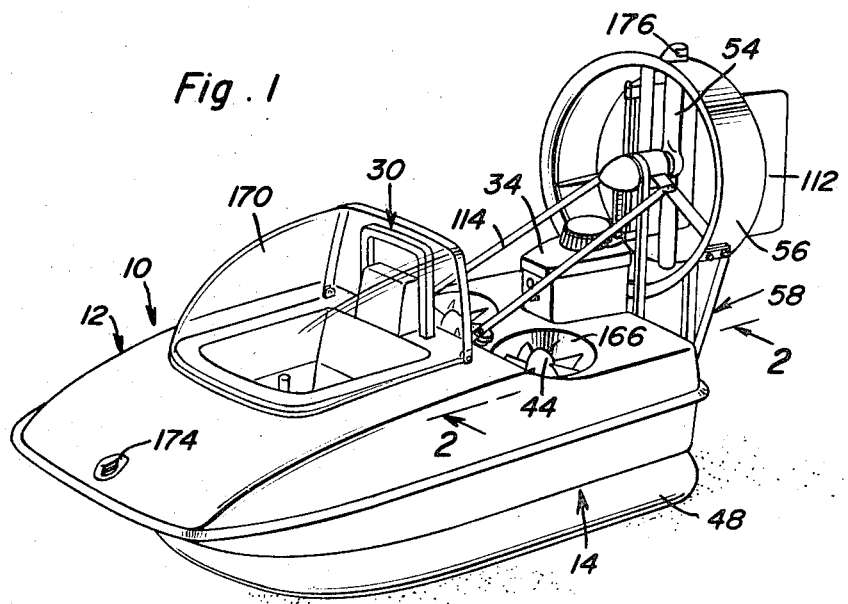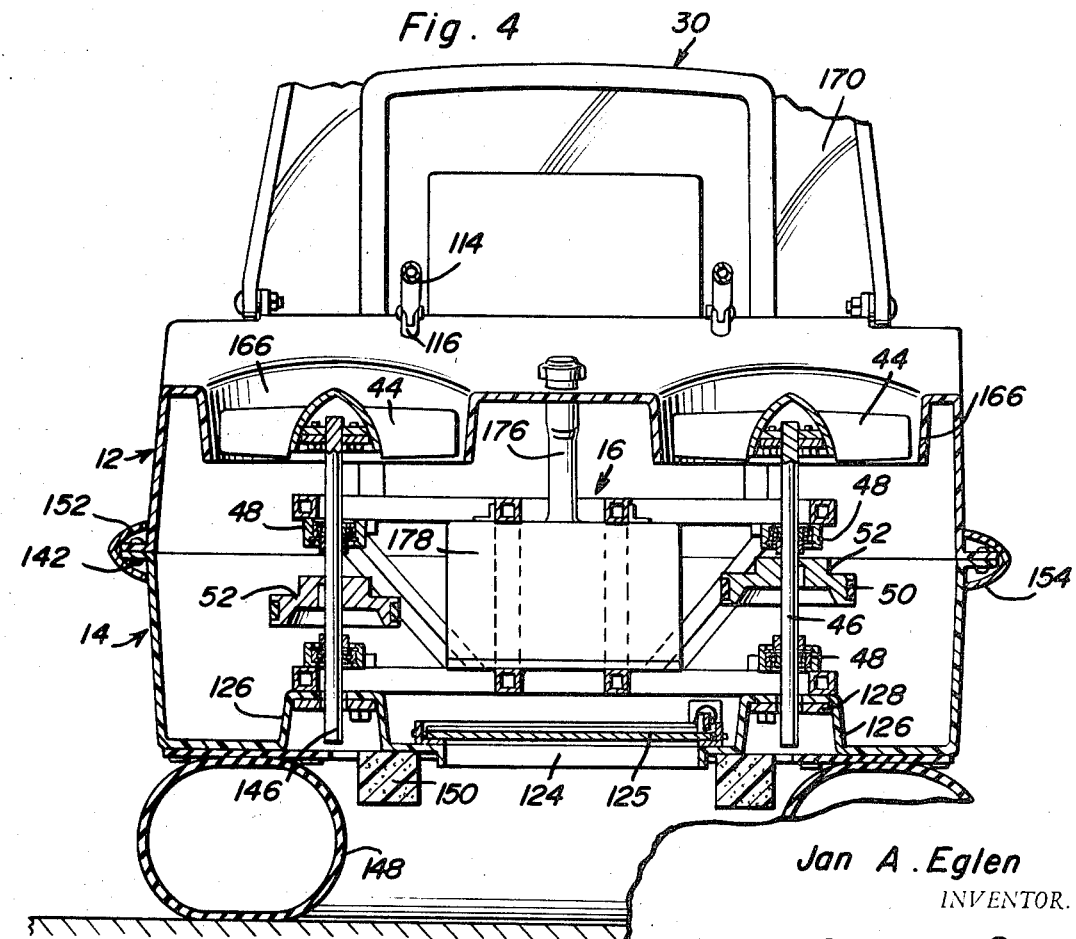

Jan A. Eglen
INVENTOR.

BY Clarence A. O'Brien
and Harvey B. Jacobson
Attorneys

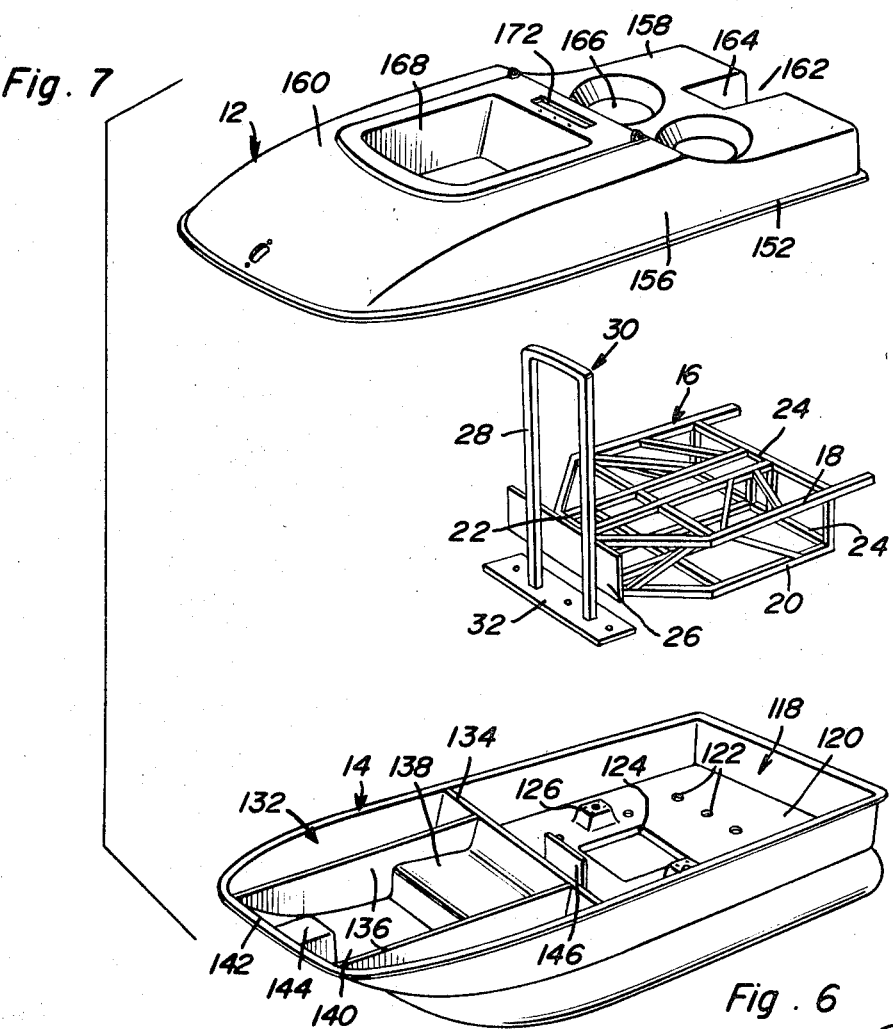
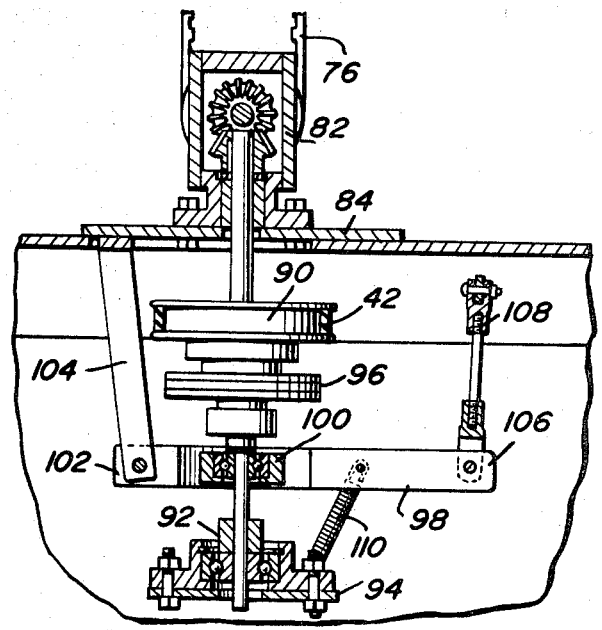
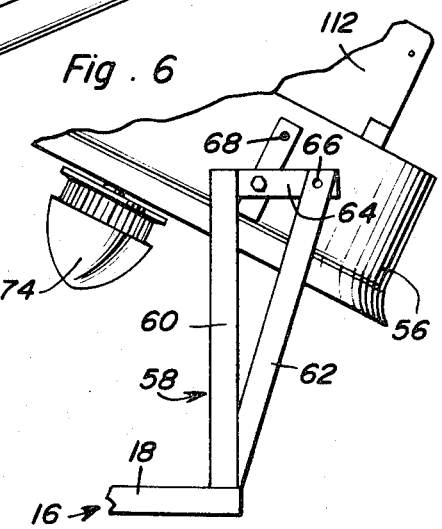
Jan A. Eglen
INVENTOR.

AIR SUPPORT VEHICLE

The instant invention relates to air cushion vehicles and more particularly to such a vehicle incorporating unique structural and operational features which combine to provide a compact operationally efficient and economically feasible passenger carrying craft.

A significant object of the instant invention is to provide an air support or air cushion vehicle which incorporates a two-part molded body and an independently formed internal frame specifically constructed so as to mount all of the operating components of the vehicle, primarily the single motor or power unit and the multiple lift and pusher fans driven thereby. Constructed in this manner, the vehicle is particularly adapted for mass production techniques, which in turn provide for an economically constructed unit and a commercially feasible product.

Another significant object of the instant invention resides in the provision of a vehicle which is compact, utilizing a single power plant for a power driving of both the lift and pusher fans.

Other objects of the instant invention reside in the provision of a craft wherein the body is molded so as to provide maximum lift and maneuverability and an inherent degree of buoyancy, the lift fan ducts are integrally molded as a portion of the upper body shell, the skirt is selectively inflatable and provides a bumper means, and the vertical pusher prop is selectively foldable so as to compact the unit.

Basically, the particular advantages sought in the instant invention are achieved through the provision of a generally rectangular tubular frame which mounts an upstanding foldable pusher fan, a power unit and one or more lift fans. The body of the craft is formed of separately molded upper and lower shells which enclose the frame and project forwardly therefrom so as to define a passenger receiving cockpit and a forwardly tapering front end. An inflatable skirt surrounds the major portion of the bottom of the craft and acts so as to confine and selectively release the lift air generated by the lift fan. The lower shell is bolted to the frame and the upper shell is in turn affixed to the lower shell peripherally thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the air cushion vehicle comprising the instant invention;

FIG. 4 is a cross-sectional view taken substantially on a plane passing along line 4—4 in FIG. 2;

FIG. 5 is an enlarged cross-sectional detail taken substantially on a plane passing along line 5—5 in FIG. 2;

FIG. 6 is an elevational detail illustrating the manner in which the push fan folds; and FIG. 7 is an exploded perspective view of the three main components of the vehicle.

Figure 2:
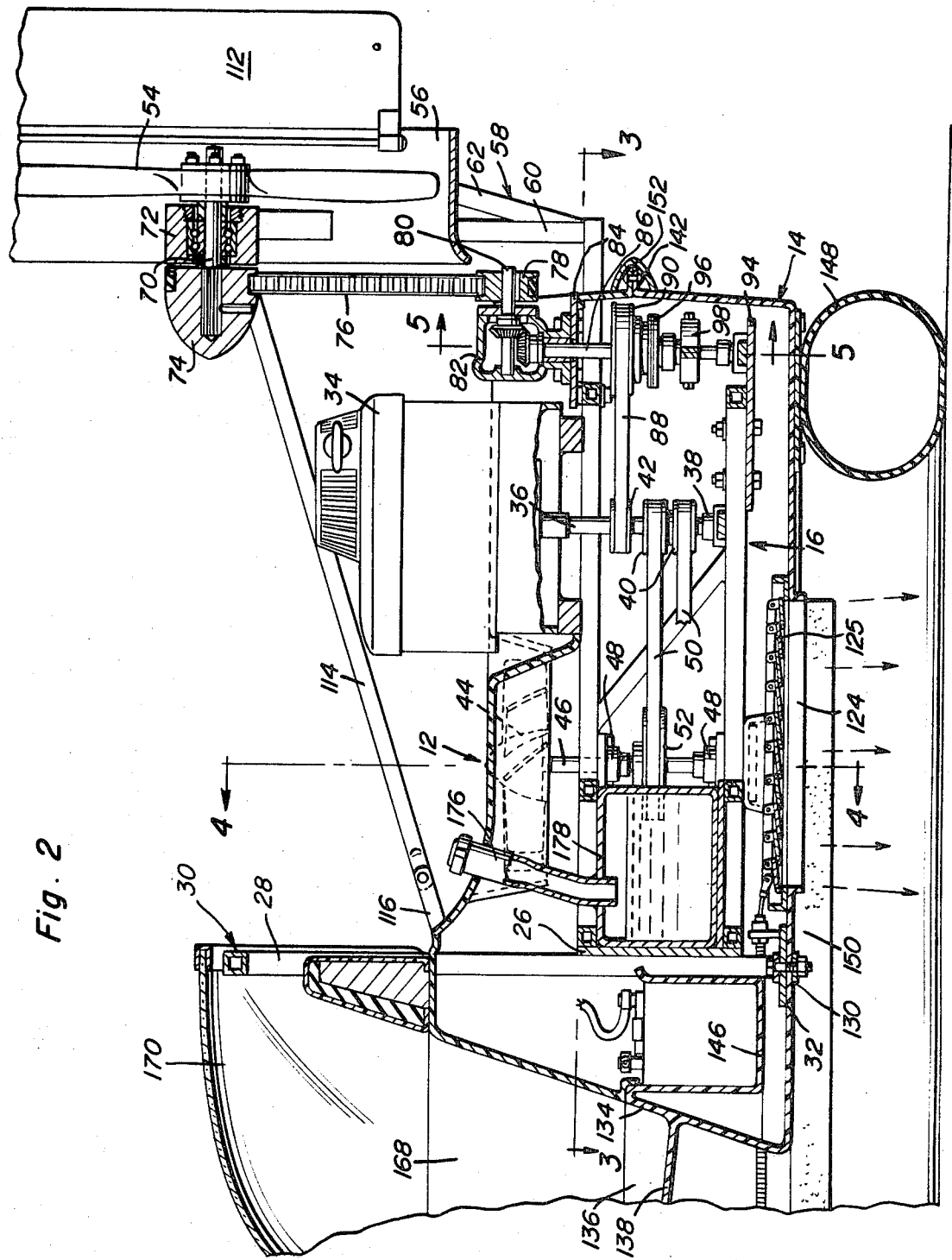
FIG. 2 is an enlarged cross-sectional view taken substantially on a plane passing along line 2—2 in FIG. 1.
Figure 3:
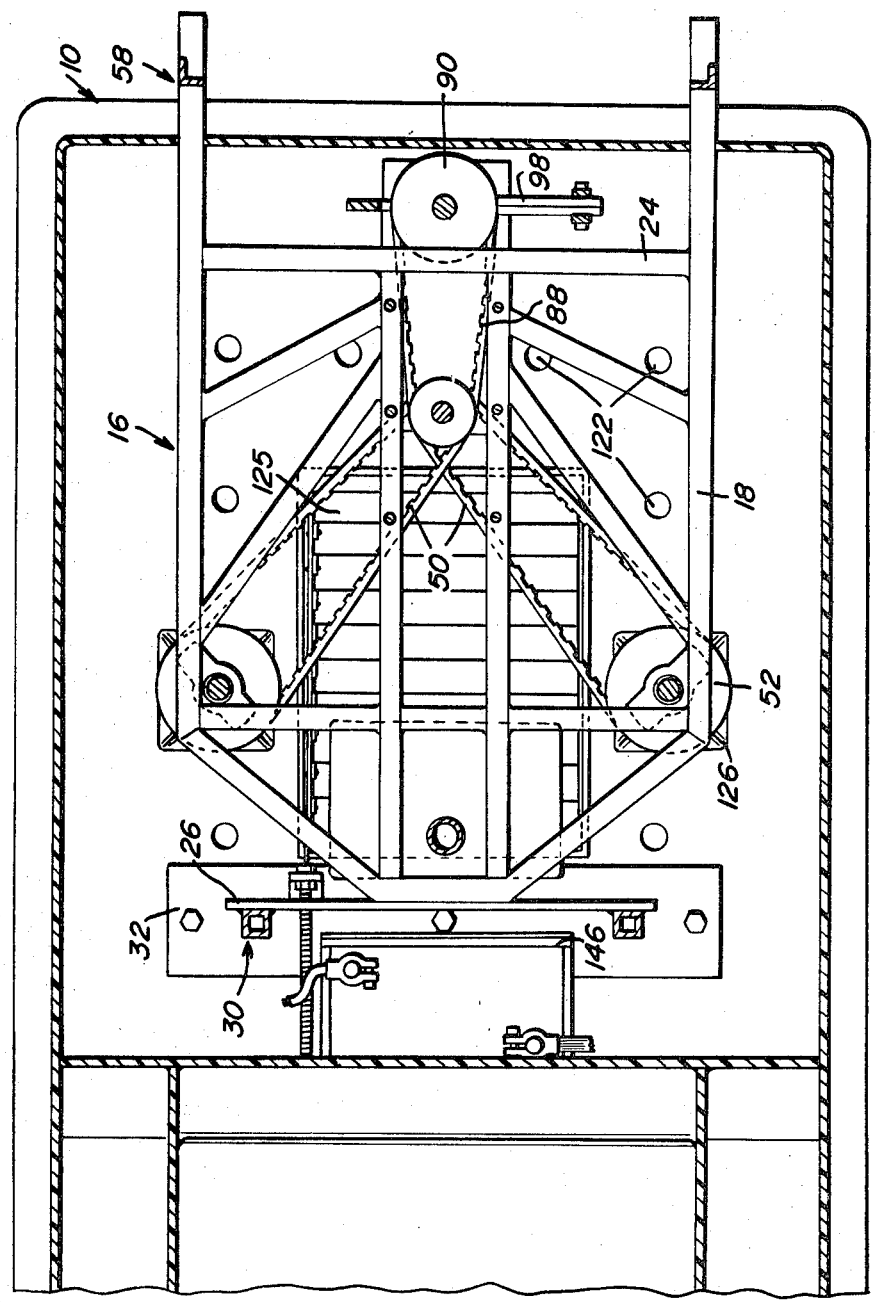
FIG. 3 is a cross-sectional view taken substantially on a plane passing along line 3—3 in FIG. 2.

Referring now more specifically to the drawings, reference numeral 10 is used to generally designate the air support or air cushion vehicle comprising the instant invention. This vehicle, noting FIG. 7, includes three basic units, upper and lower molded shells 12 and 14, of thermovacuumed plastic, glass reinforced plastic, or the like, and a welded frame 16.

The frame 16 is formed of square tubular members and is specifically configured so as to mount all of the operating components of the vehicle or craft 10 substantially independently of the two body shells 12 and 14. The frame 16 is generally rectangular and includes upper and lower parallel side beams 18 and 20, the forward portions of which converge and are interconnected, in each instance, by a relatively short transverse front beam 22. Two transverse rear beams 24 also interconnect both the rear ends of the lower side beams 20 and the upper side beams inwardly of the rearwardly projecting end portions. In other words, the transverse rear beams 24 are in a common plane with the longer upper side beams 18 projecting rearwardly thereof. The frame 16 is internally completed and braced by supplemental beams extending longitudinally, transversely and diagonally between the various side, front and rear beams so as to provide a highly rigidified structure. A flat vertically orientated elongated plate 26 is welded or otherwise permanently affixed across the front of the frame 16 and projects laterally beyond both ends of the relatively short front beams 22. This plate 26 in turn has the two vertical legs 28 of a roll bar 30 rigidly affixed thereto, also preferably by welding. The legs 28, as will be appreciated from the drawings, project a substantial distance above the frame 16 and a relatively shorter distance below the frame 16. A horizontally oriented elongated flat mounting plate 32 is secured to the lower ends of the roll bar legs 28.

As previously indicated, the frame 16 is to mount all of the operating components of the vehicle or craft 10. These components include an enlarged power plant or motor 34 mounted centrally on the upper portion of the frame 16 adjacent the upper rear transverse beam 24. A vertical drive shaft 36 depends from the motor 34 and has the lower end thereof rotatably received and stabilized by an appropriate bearing unit 38 mounted on the lower portion of the frame 16. This drive shaft 36 mounts a pair of lift fan driving pulleys 40 and a single pusher fan pulley 42.

The lift fans 44 are horizontally orientated and positioned over the upper portion of the frame 16 to the opposite sides thereof in general alignment over the points at which the opposed upper side beams 18 angle inwardly. Each of the lift fans 44 includes a vertical depending shaft 46 which is mounted within appropriate thrust bearings 48 affixed to aligned upper and lower portions of the frame 16, the shafts 46 projecting a slight distance below the bottom of the frame 16. Each lift fan shaft 46 and hence the fan 44 thereon, is driven by an endless belt 50 extending from the appropriate pulley 40 on the motor drive shaft 36 about a similar pulley 52 on the appropriate fan shaft 46.

The pusher prop or fan 54 is positioned vertically to the rear and above the frame 16 within a circular duct or duct-like housing 56. A pair of side supports 58, each consisting of a first vertical member 60 and a second slightly rearwardly inclined member 62, are welded to the rear ends of the upper side beams 18 and project vertically therefrom to the opposed sides of the pusher fan housing 56. Each support 58 includes a transverse member fixed between the outer ends of the vertical members 60 and 62 with these members 64 in turn pivotally mounting the housing 56 therebetween. In this manner, the pusher prop 54 and housing 56 can be selectively shifted from the vertical operative position of FIGS. 1 and 2 to the stored or inoperative position of FIG. 6. Each of the supports 58 is provided with a bolt or pin opening 66 laterally aligned with the pivot pin which mounts the housing 56 for a selective reception of an appropriate locking pin or bolt therethrough. A similar opening 68 in the housing 56 aligns therewith upon a vertical orientation of the housing 56 so as to releasably lock the housing 56 and pusher fan 54 in the vertical operative position thereof.

The pusher fan 54 includes a rearwardly directed central shaft 70 rotatably received through a mounting hub 72 and projecting rearwardly therebeyond to mount a combined retaining and driving pulley member 74. A belt 76 engages about the pulley member 74 and extends vertically therebelow about a pulley 78 fixed to a shaft 80 projecting horizontally from a gear box 82. The box 82 is mounted on a horizontal plate 84 fixed to the frame 16 rearward of the motor 34. The driving force is introduced into the gear box 82 through vertical shaft means 86. The shaft means 86 is driven from the motor drive shaft 36 by a belt 88 engaged about the pulley 42 and a pulley 90 mounted on the shaft means 86. Noting FIGS. 2 and 5 in particular, the lower end of the shaft means is rotatably supported within an appropriate bearing unit 92 mounted on a support plate 94 fixed to and extending rearwardly from the rear lower portion of the frame 16. A clutch unit 96 is mounted on the shaft means 86 below the pulley 90 and is selectively controlled by a shifting fork 98 mounted for vertical movement therebelow. The shifting fork 98 includes a central shaft surrounding gimbal-like unit 100, a first end portion 102 pivotally secured to the lower end of a rigid member 104 fixed to and depending from the gear box mounting plate 84, and a second end portion 106 vertically movable through an appropriate linkage means 108 extending to and controlled from the passenger compartment. The shifting fork is normally biased downward by spring means 110 so as to disengage the clutch. The engagement of the clutch, and hence the activation of the pusher prop 54 requires a positive manipulation of the clutch controlling linkage 108.

Referring again to the pusher fan assembly, it will be noted that a pair of upstanding pivotally mounted rudder blades 112 are provided on the prop housing 56 and project rearwardly therefrom. These rudders are in turn controlled by appropriate cable means engaged therewith and extending to a point accessible from the passage compartment. In order to insure the rigidity of the prop assembly in its vertical operative position, a pair of rearwardly directed braces 114 are pivotally mounted at one end to the fan housing 56 or hub mounting arms, and releasably bolted, at the second ends thereof, to a pair of rigid brackets 116 fixed to the upper shell 12. When a folding of the prop assembly is desired, the bracket connected ends of the braces 114 are merely disengaged so as to enable an upwardly swinging of the braces in conjunction with a downward swinging of the prop assembly.

Referring now to the bottom body shell 14, it will be noted that this molded shell includes a rear frame receiving compartment 118 including a flat bottom 120 incorporating a series of air passing openings 122 and an enlarged central rectangular opening 124. The enlarged opening 124 is selectively opened and closed by a louver-type shutter unit 125 mounted thereover and cable controlled from the passenger compartment so as to regulate the bleeding of air to the plenum beneath the craft. To the opposite sides of the enlarged opening 124 are a pair of integrally formed raised portions 126 incorporating flat tops which define seats for the reception of the frame 16. Each of these raised portions 126 includes a mounting plate 128 underlying the flat top thereof, note FIG. 4 in particular, which plates 128 are utilized in bolting the overlying frame structure to the frame supporting portions 126 of the lower shell 14. An additional securing and stabilization of the frame 16 relative to the lower shell 14 is effected by a bolting of the roll bar base plate 32 directly to the flat bottom 120 of the rear compartment 118. Such a bolt mounting will normally also utilize an underlying plate 130. If so desired, cushioning or shock absorbing material can be used at the points of bolted engagement between the frame 16 and the bottom shell 14.

In addition to the rear frame receiving compartment 118, the lower shell 14 includes a forward portion 132 separated from the rear portion or compartment 118 by a transverse partition wall 134. The forward lower portion 132 includes a pair of longitudinally extending laterally spaced partition walls 136 which define a central passenger portion or cockpit therebetween within which a seat 138 is formed just forward of the partition wall 134. The floor of the forward section 132 curves upwardly to a forward laterally directed edge flange 142. This edge flange 142 in fact continues peripherally around the lower shell 14 and provides a means for interlocking the upper shell 12 thereto. The upwardly curving forward bottom portion 140 provides a streamline configuration to the lower shell which facilitates the lift and forward movement of the craft, giving it in effect an aerodynamic configuration. Likewise, this configuration reduces hydrodynamic drag when the craft is operating in the displacement mode, that is, lets the craft plane easier as it comes up on the air cushion. The box-like recess 144 provided in the front portion of the lower shell 14 is for the mounting of an appropriate headlight unit which, when mounted, will provide for a smooth continuation of the curving bottom 140. Integrally formed as a portion of the bottom shell 14 is a small battery compartment 146 located centrally immediately behind the transverse partition wall 134.

The skirt 148 which surrounds and defines the air chamber or plenum beneath the craft 10 is in the nature of an enlarged inflatable tube which, in addition to acting in the manner of an air containing and selectively releasing skirt so as to provide the desired lift effect, also acts in the manner of a bumper.

In addition to the buoyancy inherent in the shell construction of the craft, flotation means can be provided within the lower shell 14. Further, appropriate skid-like supports 150 are provided inward of the opposed longitudinally extending portions of the tubular skirt 148 for a support of the craft or vehicle upon a deflation of the tubular skirt 148. It is contemplated that the skirt will extend peripherally about the opposed sides and across the back of the rear frame receiving chamber, and forward therefrom so as to encompass approximately one-half of the forward section or at least that portion thereof which will contain the cockpit or passenger compartment. As indicated previously, the lift fan generated air will escape into the air chamber through the openings 122 in the bottom of the frame compartment 118, as well as through the louver controlled enlarged central opening 124.

The upper shell 12 also includes a peripheral laterally directed flange 152 which seats on and is welded, bolted or otherwise rigidly affixed to the peripheral flange 142 of the lower shell 14 for effecting a positive bonding of the upper and lower shells 12 and 14 to each other. The flange joint is completed by an appropriate covering strip 154. The upper shell 12 additionally includes opposed side walls 156 and a top composed of a rear frame covering deck 158 and a forward deck 160. The rear deck 158 includes an enlarged central rearwardly directed recess 162, including side walls 164, which forms a motor well for the accommodation of the motor 34. Forward of the motor well 162, the rear deck 158 includes a pair of enlarged fan wells or ducts 166 integrally formed therein and including, in each instance, a depending circular wall accommodating the corresponding lift fan and providing a cooperating air intake duct therefor. This integral forming of the intake ducts 156 with the top shell is considered particularly significant in contributing to the construction of a highly practical and commercially feasible structure.

While the rear deck 158 is substantially flat, the forward deck tapers forwardly gradually within the cockpit or passenger compartment area and then at a greater rate so as to terminate at the forward portion of the peripheral flange 152, thus in effect corresponding with the taper of the bottom which converges thereto. In this manner, the aerodynamic configuration of the craft is completed.

In order to complete the cockpit or passenger compartment, the upper shell 12 includes, in the front deck 160, an enlarged open cockpit portion defined by depending peripheral walls 168 which align with the partition walls 134 and 136 of the lower shell 14 so as to seat thereon upon a joining of the shells. If so desired, a clear plastic canopy 170 can be provided over the cockpit and hingedly mounted for a rearward swinging thereof so as to allow passage to and from the cockpit. In addition, so as to accommodate the upwardly projecting roll bar 30, it will be noted that the rear portion of the front deck 160, immediately behind the cockpit forming portion, is provided with an elongated opening 172 through which the roll bar 30 extends. If so desired, appropriate provision can be made at the forward portion of the top deck 160 for a boat light 174 or the like, a similar boat light 176 normally being mounted on the top of the pusher fan hood.

Noting FIGS. 2 and 4 in particular, provision is made in the top shell 12, immediately behind the front deck 160, for the accommodation of a gas tank filler pipe 176 which leads to an appropriate gas or fuel tank 178 mounted within the frame 16.

From the foregoing, it will be appreciated that a highly unique air cushion vehicle or ground effects machine has been defined. This machine incorporates a compactness and structural practicality which has not normally heretofore been associated with similar machines, and which significantly contributes to the commercial feasibility thereof. Of particular significance is the formation of the machine or vehicle utilizing three basic components, the frame, which mounts all of the operating members in a unique arrangement and independent of the body, and the upper and lower body shells which combine to enclose the frame and form the passenger compartment. While not specifically indicated above, it will be appreciated that the basic construction set forth can be utilized in a craft capable of accommodating 1, 2 or more passengers. Further, the lift fans can be in the nature of axial flow fans or centrifugal flow fans. It is contemplated that if a centrifugal flow fan is utilized, only a single fan will be provided centered between the locations of the two illustrated fans.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an air support vehicle, a body, a unitary self-contained frame mounted within said body, and operating components including lift fan means, pusher fan means, motor means and drive means operatively engaged between the motor means and both fan means, said operating components being operatively mounted on said frame independently of said body, said body enclosing said frame, means securing said body to said frame, said body being formed of a pair of upper and lower shells, said shells joining at approximately mid-height on said craft about said frame, said upper shell including a forward compartment forming section and a rear frame covering section, said rear section having integrally formed inwardly opening air duct means formed therein and in alignment with said lift fan means for enabling an intaking of air thereto, the rear section of the upper shell being formed so as to define a motor well, said frame mounted motor means projecting upwardly therethrough, said pusher fan means projecting vertically above said upper shell rearward of the motor means, and means mounting said pusher fan means for a selective forward folding thereof to an inoperative position.

2. The vehicle of claim 1 wherein said lift fan means is orientated forward of the motor means on said frame, said pusher fan means being mounted rearward of said motor means, said drive means including shafts on said lift fan means and pusher fan means rotatably mounted on said frame, a single drive shaft extending from said motor means, and endless drive means engaged between said drive shaft and the fan shafts for a common driving thereof from said motor means drive shaft.

3. The vehicle of claim 1 wherein said frame is generally rectangular in shape, constructed of a plurality of welded tubular bars and including vertically spaced and rigidly connected upper and lower portions.

4. In an air support vehicle, a body, a unitary self-contained frame mounted within said body, and operating components including lift fan means, pusher fan means, motor means and drive means operatively engaged between the motor means and both fan means, said operating components being operatively mounted on said frame independently of said body, said body enclosing said frame, means securing said body to said frame, said frame being generally rectangular in shape, constructed of a plurality of welded tubular bars and including vertically spaced and rigidly connected upper and lower portions, and a vertically elongated roll bar permanently affixed to the front of said frame and projecting vertically thereabove and vertically therebelow, the lower end of said roll bar having a mounting plate rigidly affixed thereto for engagement with the lower portion of the body.

5. In an air support vehicle, a body, a unitary self-contained frame mounted within said body, and operating components including lift fan means, pusher fan means, motor means and drive means operatively engaged between the motor means and both fan means, said operating components being operatively mounted on said frame independently of said body, said body enclosing said frame, means securing said body to said frame, said body including a rear section overlying the frame and formed so as to define a motor well, said frame mounted motor means projecting upwardly therethrough, said pusher fan means projecting vertically above the overlying body section rearward of the motor means, and means mounting said pusher fan means for a selective forward folding thereof to an inoperative position.

6. In an air support vehicle, a body, a unitary self-contained frame mounted within said body, and operating components including lift fan means, pusher fan means, motor means and drive means operatively engaged between the motor means and both fan means, said operating components being operatively mounted on said frame independently of said body, said body enclosing said frame, means securing said body to said frame, said body being formed of a pair of upper and lower shells, said shells joining at approximately mid-height on said craft about said frame, said lower shell including a forward passenger compartment forming section and a rear frame receiving section, said rear section including air passage means opening downwardly therethrough, said upper shell including a forward passenger compartment forming section and a rear frame covering section, the rear section of the upper shell being formed so as to define inwardly opening intake air duct means, in alignment with the frame mounted lift fan means, the forward sections of the upper and lower shells being configured so as to define, in combination, a recessed walled passenger receiving compartment, the forward sections of the upper and lower shells, generally forward of the passenger compartment, converge toward each other so as to terminate in a thin forward edge and produce an aerodynamic configuration, the rear section of the upper shell being formed so as to define a motor well, said frame mounted motor means projecting upwardly therethrough, said pusher fan means projecting vertically above said upper shell rearward of the motor means, and means mounting said pusher fan means for a selective forward folding thereof to an inoperative position.

7. The vehicle of claim 6 wherein said lift fan means is orientated forward of the motor means on said frame, said drive means including shafts on said lift fan means and pusher fan means rotatably mounted on said frame, a single drive shaft extending from said motor means, and endless drive belt means engaged between said drive shaft and the fan shafts for a common driving thereof from said motor means drive shaft.

8. The vehicle of claim 7 wherein said lift fan means comprises a pair of laterally spaced lift fans simultaneously driven from said motor means drive shaft, and clutch means operatively interposed between the motor means drive shaft and the pusher fan means for a selective engagement and disengagement of the pusher fan means.

9. The vehicle of claim 8 wherein said frame is generally rectangular in shape, constructed of a plurality of welded tubular bars and including vertically spaced and rigidly connected upper and lower portions.

10. The vehicle of claim 9 including a vertically elongated roll bar permanently affixed to the front of said frame and projecting vertically thereabove and vertically therebelow, the lower end of said roll bar having a mounting plate rigidly affixed thereto for engagement with the lower body shell.

11. The vehicle of claim 10 wherein the rear section of the lower shell includes upwardly projecting frame seating and mounting portions formed therein.

12. The vehicle of claim 11 including an enlarged opening defined centrally through the bottom of the rear section of the lower shell, and controllable closure means associated with said opening for an adjustable closing and opening thereof.

* * * * *